United States Patent
Wuest et al.

(10) Patent No.: US 8,945,702 B2
(45) Date of Patent: Feb. 3, 2015

(54) BARRIER PACKAGING WEBS HAVING METALLIZED NON-ORIENTED FILM

(75) Inventors: Sam Edward Wuest, Oshkosh, WI (US); Curtis Randolph Barr, Neenah, WI (US); Chris Scott Mussell, New London, WI (US); Steven James Dennis, Kaukauna, WI (US)

(73) Assignee: Bemis Company, Inc., Neenah, WI (US)

( * ) Notice: Subject to any disclaimer, the term of this patent is extended or adjusted under 35 U.S.C. 154(b) by 875 days.

(21) Appl. No.: 11/932,031

(22) Filed: Oct. 31, 2007

(65) Prior Publication Data

US 2009/0110888 A1 Apr. 30, 2009

(51) Int. Cl.
*B32B 3/00* (2006.01)
*B32B 27/28* (2006.01)

(52) U.S. Cl.
CPC ........................................ *B32B 27/28* (2013.01)
USPC ........................... 428/200; 156/230; 156/233

(58) Field of Classification Search
USPC .................................................. 428/457, 35.7
See application file for complete search history.

(56) References Cited

U.S. PATENT DOCUMENTS

| | | |
|---|---|---|
| 3,620,825 A | 11/1971 | Lohmann et al. |
| 4,731,266 A | 3/1988 | Bonnebat et al. |
| 4,798,081 A | 1/1989 | Hazlitt et al. |
| 4,944,409 A | 7/1990 | Busche et al. |
| 4,997,707 A | 3/1991 | Otawa et al. |
| 5,010,145 A | 4/1991 | Ikada et al. |
| 5,026,798 A | 6/1991 | Canich |
| 5,142,023 A | 8/1992 | Gruber et al. |
| 5,153,074 A | 10/1992 | Migliorini |
| 5,192,620 A | 3/1993 | Chu et al. |
| 5,223,311 A | 6/1993 | Tsutsumi et al. |
| 5,283,118 A | 2/1994 | Murakami et al. |
| 5,374,459 A | 12/1994 | Mumpower et al. |
| 5,593,778 A | 1/1997 | Kondo et al. |
| 5,698,317 A | 12/1997 | Kurokawa et al. |
| 5,698,322 A | 12/1997 | Tsai et al. |

(Continued)

FOREIGN PATENT DOCUMENTS

| | | |
|---|---|---|
| CA | 2115195 | 8/1994 |
| EP | 1674254 A2 | 6/2006 |

(Continued)

*Primary Examiner* — Ronak Patel
(74) *Attorney, Agent, or Firm* — Tom J. Hall

(57) ABSTRACT

The present invention provides flexible packaging webs comprising a non-oriented metallized sealant film characterized by a secant modulus of less than 120,000 psi and an elongation at break of greater than 150%, wherein the non-oriented metallized sealant film comprises (1) a thermoplastic base layer of a material selected from the group consisting of ethylene/vinyl alcohol copolymer, ethylene/acrylic acid copolymer, ethylene/norbornene copolymer, polyamide and blends thereof; (2) a metal coating deposited on the base layer and having an optical density of 1.0 to 3.0; and (3) a heat sealing layer. The packaging webs of the present invention each exhibit an oxygen gas transmission rate of between 0 to 10.0 cm$^3$/100 in$^2$/24 hours at 73° F. (0 to 155 cm$^3$/m$^2$/24 hours at 23° C.) and 0% relative humidity and a water vapor transmission rate of between 0 to 0.1 g/100 in$^2$/24 hours at 100° F. (0 to 1.55 g/m$^2$/24 hours at 38° C.) and 90% relative humidity. The sealant films are formed by a blown coextrusion method.

11 Claims, 2 Drawing Sheets

(56) References Cited

U.S. PATENT DOCUMENTS

| | | | |
|---|---|---|---|
| 5,760,144 A | 6/1998 | Ozeki et al. | |
| 5,807,973 A | 9/1998 | Gruber et al. | |
| 5,827,615 A * | 10/1998 | Touhsaent et al. | 428/463 |
| 5,888,648 A | 3/1999 | Donovan et al. | |
| 5,902,848 A | 5/1999 | Burgin et al. | |
| 6,060,137 A | 5/2000 | Akao | |
| 6,194,054 B1 | 2/2001 | Peiffer et al. | |
| RE37,171 E | 5/2001 | Busche et al. | |
| 6,248,442 B1 | 6/2001 | Kong et al. | |
| 6,511,756 B1 | 1/2003 | Obuchi et al. | |
| 6,551,653 B1 | 4/2003 | Hatke et al. | |
| 6,605,344 B1 | 8/2003 | Ohba et al. | |
| 6,623,866 B2 | 9/2003 | Migliorini et al. | |
| 6,663,974 B2 | 12/2003 | Kelch et al. | |
| 6,716,499 B1 | 4/2004 | Vadhar | |
| 6,723,431 B2 | 4/2004 | Mallory et al. | |
| 6,863,964 B2 | 3/2005 | Migliorini et al. | |
| 6,908,687 B2 | 6/2005 | Mendes et al. | |
| 6,964,816 B2 | 11/2005 | Schell et al. | |
| 7,087,314 B2 | 8/2006 | Forte et al. | |
| 7,101,624 B2 | 9/2006 | Bradley | |
| 7,130,007 B2 | 10/2006 | Hata et al. | |
| 7,288,316 B2 | 10/2007 | Jester | |
| 2002/0090522 A1 | 7/2002 | Jacobsen et al. | |
| 2003/0044552 A1 | 3/2003 | Komada | |
| 2003/0186047 A1* | 10/2003 | Trouilhet | 428/343 |
| 2004/0142190 A1* | 7/2004 | Kawai et al. | 428/461 |
| 2004/0236024 A1* | 11/2004 | Rivett et al. | 525/210 |
| 2005/0028923 A1* | 2/2005 | Francois | 156/230 |
| 2005/0042399 A1 | 2/2005 | Shiokawa et al. | |
| 2005/0287359 A1 | 12/2005 | Breese | |
| 2006/0046006 A1 | 3/2006 | Bastion et al. | |
| 2006/0134418 A1 | 6/2006 | Nomula | |
| 2006/0141241 A1* | 6/2006 | Carespodi et al. | 428/327 |
| 2006/0172131 A1 | 8/2006 | Haedt et al. | |
| 2006/0251840 A1* | 11/2006 | Hutt et al. | 428/35.9 |
| 2006/0257652 A1* | 11/2006 | Su | 428/355 EN |
| 2006/0269707 A1 | 11/2006 | Berbert | |
| 2006/0286323 A1* | 12/2006 | Siegel et al. | 428/35.7 |
| 2007/0031690 A1 | 2/2007 | Busche et al. | |
| 2007/0082161 A1 | 4/2007 | Cruz et al. | |
| 2007/0092717 A1* | 4/2007 | Yoshida et al. | 428/336 |
| 2007/0202337 A1 | 8/2007 | Lischefski et al. | |
| 2009/0130407 A1* | 5/2009 | Hata | 428/213 |
| 2009/0258173 A1* | 10/2009 | Hata | 428/35.9 |
| 2010/0195938 A1* | 8/2010 | Manabe et al. | 383/109 |
| 2010/0280178 A1 | 11/2010 | Ikeda et al. | |

FOREIGN PATENT DOCUMENTS

| | | | |
|---|---|---|---|
| JP | 5229070 A | 9/1993 | |
| JP | 10337834 A | 12/1998 | |
| JP | 2001047561 A | 2/2001 | |
| JP | 2001113634 A | 4/2001 | |
| JP | 2001334620 A | 12/2001 | |
| JP | 2002172727 A | 6/2002 | |
| JP | 2006233222 A | 9/2006 | |
| WO | WO02/45958 A2 | 6/2002 | |
| WO | WO 2006/118251 | * | 11/2006 |
| WO | WO 2006/126370 | * | 11/2006 |

\* cited by examiner

BARRIER PACKAGING WEBS HAVING METALLIZED NON-ORIENTED FILM

TECHNICAL FIELD

This invention relates to the field of packaging. Particularly, the present invention relates to flexible packaging webs suitable for use in packaging applications and, more particularly, to packaging webs for oxygen and moisture sensitive food and non-food products.

BACKGROUND OF THE INVENTION

Plastic materials such as polymeric films have been widely used for packaging various food and non-food products. In order to ensure proper preservation of products packaged in such polymeric films, it is necessary to provide the films with barriers against transmission of air, moisture, deleterious flavors, etc. Unmodified polymeric films, however, typically lack sufficient gas and moisture barrier characteristics needed for proper packaging requirements. For example, polyolefin films are particularly preferred in the manufacture of packaging films due to their low cost and ease of manufacture. Such films, however, typically permit the transmission of oxygen and water vapor from the outside of the film to the inside of the package made up of the film. As will be recognized by those skilled in the art, transmission of oxygen and water vapor through food packaging materials promotes deterioration of the foods packaged therein.

The use of a metallized film to improve the barrier properties of flexible packaging films is known in the art. Typically such barrier films are formed by depositing a thin layer of a metal, most typically aluminum, onto a thermoplastic substrate oriented prior to metal deposition. A requirement of these polymer substrates or films is that they be uniaxially oriented, i.e., stretched in one direction, or, most often, biaxially oriented, i.e., stretched in both a longitudinal direction and the transverse direction, before being metallized. For example, U.S. Pat. No. 5,283,118 to Murakami et al., the disclosure of which is incorporated herein by reference, discloses metallized oriented films having water vapor transmission values (WTR) between 0.011 to 0.10 g/100 in$^2$/24 hours and oxygen transmission values (O$_2$TR) between 1 to 30 cm$^3$/100 in$^2$/24 hours. The metallization is carried out by vacuum-vapor deposition of aluminum and aluminum alloys on the surface of a biaxially oriented propylene homopolymer or copolymer substrate. U.S. Pat. No. 5,698,317 to Kurokawa et al., the disclosure of which is incorporated herein by reference, teaches that oxygen transmission rates between 0.4 to 1.14 cm$^3$/100 in$^2$/24 hours for films can be obtained by vacuum vapor-deposition of a metal onto the surface of biaxially oriented multilayer film packaging webs having a polypropylene-based composition. U.S. Pat. No. 5,827,615 to Touhsaent et al., the disclosure of which is incorporated herein by reference, discloses an ethylene/vinyl alcohol (EVOH) surface biaxially oriented film substrate having an aluminum coating which is applied by conventional vacuum deposition. The resulting films have excellent barrier properties, i.e., WVTR values of less than 0.1 g/100 in$^2$/24 hours and O$_2$TR values of less than 0.1 cm$^3$/100 in$^2$/24 hours.

A need exists for a metallized packaging material having sufficient gas and moisture barrier properties formed from a non-oriented substrate.

BRIEF SUMMARY OF THE INVENTION

It is an object of the present invention to provide a flexible packaging web having a coextruded non-oriented metallized sealant film with improved oxygen barrier, water vapor barrier and/or sealing properties.

It is a further object of the present invention to provide a flexible packaging web having a coextruded non-oriented metallized sealant film with improved barrier properties which is simple and inexpensive to manufacture.

These and other objects are achieved in the present invention which provides a flexible packaging web
a) comprising a coextruded non-oriented metallized sealant film characterized by a secant modulus of less than 120,000 psi and an elongation at break of greater than 150%, wherein the non-oriented metallized sealant film comprises (1) a thermoplastic base layer of a material selected from the group consisting of ethylene/vinyl alcohol copolymer, ethylene/acrylic acid copolymer, ethylene/norbornene copolymer, polyamide and blends thereof, (2) a metal coating deposited on the base layer and having an optical density of 1.0 to 3.0; and (3) a heat sealing layer; b) wherein the packaging web has an oxygen gas transmission rate of between 0 to 10.0 cm$^3$/100 in$^2$/24 hours at 73° F. (0 to 155 cm$^3$/m$^2$/24 hours at 23° C.) and 0% relative humidity and a water vapor transmission rate of between 0 to 0.1 g/100 in$^2$/24 hours at 100° F. (0 to 1.55 g/m$^2$/24 hours at 38° C.) and 90% relative humidity.

Preferably, the non-oriented film is coextruded by a blown coextrusion method.

In one embodiment of the present invention, the base layer is an ethylene/vinyl alcohol copolymer and the packaging web has an oxygen gas transmission rate of between 0 to 0.5 cm$^3$/100 in$^2$/24 hours at 73° F. (0 to 7.75 cm$^3$/m$^2$/24 hours at 23° C.).

In another embodiment of the present invention, the base layer is an ethylene/acrylic acid copolymer and the packaging web has an oxygen gas transmission rate of between 0 to 0.5 cm$^3$/100 in$^2$/24 hours at 73° F. (0 to 7.75 cm$^3$/m$^2$/24 hours at 23° C.).

In yet another embodiment of the present invention, the base layer is a polyamide and the packaging web has an oxygen gas transmission rate of between 0 to 0.5 cm$^3$/100 in$^2$/24 hours at 73° F. (0 to 7.75 cm$^3$/m$^2$/24 hours at 23° C.).

In still another embodiment of the present invention, the base layer is an ethylene/norbornene copolymer and the packaging web has an oxygen gas transmission rate of between 0 to 5.0 cm$^3$/100 in$^2$/24 hours at 73° F. (0 to 77.5 cm$^3$/m$^2$/24 hours at 23° C.).

In some embodiments, the packaging web has a minimum heat seal strength of 2,000 g/in (2,000 g/2.54 cm) at 280° F. (138° C.).

The flexible packaging web of the present invention may further include a second ply of an oriented or non-oriented film. Oriented films of the second-ply may comprise any thermoplastic material and, preferably, include a thermoplastic film having at least one layer of polyethylene terephthalate, polypropylene, polyamide, polylactic acid or blends thereof. Non-oriented films may include any thermoplastic or non-thermoplastic material, such as, for example, paper, paperboard, cardboard, regenerated cellulose and the like. In one embodiment, the present invention is a multi-ply packaging web having an oriented film adjacent to the metal layer of the non-oriented metallized sealant film. In another embodiment, the present invention is a multi-ply packaging web having a non-oriented film adjacent to the metal layer of the non-oriented metallized sealant film. In yet another embodiment, the present invention is a two-ply packaging web having an oriented film adjacent to the metal layer of the non-oriented metallized sealant film.

DEFINITIONS

Figure 1:
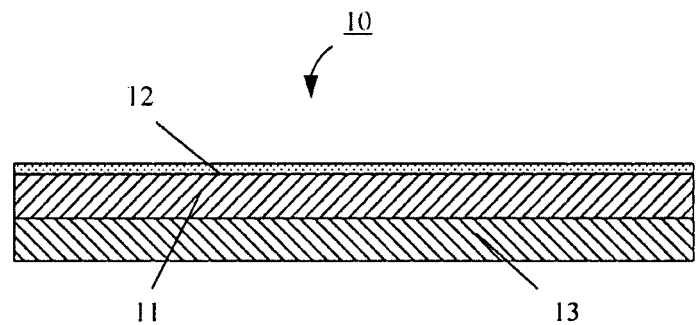
FIG. 1 is an illustration of a cross-sectional view of one embodiment of a non-oriented metallized sealant film according to the present invention.

As used herein, the terms "lamination" and "laminate" refer to the process, and resulting product, made by bonding together two or more continuous film surfaces to form a multi-film structure. Lamination can be accomplished by joining films with an adhesive using adhesive lamination or with a tie layer using extrusion coating. Lamination is described in U.S. Pat. No. 5,374,459, to Mumpower et al., which incorporated herein by reference.

The term "thermoplastic" refers to a material that softens when exposed to heat and which substantially returns to a non-softened condition when cooled to room temperature. In some embodiments of the present invention, the first web or the second web, and, preferable, at least the second web-of the packaging web, comprises a thermoplastic material. Alternatively, both the first and second webs of the packaging web include a thermoplastic material.

The term "polymers" includes, but is not limited to, homopolymers and copolymers, such as for example, block, graft, random and alternating copolymers, terpolymers, etc., and blends and modifications thereof Furthermore, unless otherwise specifically limited, the term "polymer" shall include all possible configurational isomers of the material. These configurations include, but are not limited to isotactic, syndiotactic and atactic symmetries.

As used herein, the term "copolymer" refers to polymers formed by the polymerization reaction of at least two different monomers. For example, the phrase "ethylene/norbornene copolymer" may include the co-polymerization reaction product of ethylene and norbornene. The term "copolymer" refers to a copolymer in which either monomer may copolymerize in a high weight or molar percent than the other monomer or monomers. However, the first listed monomer preferably polymerizes in a higher weight percent than the second listed monomer. Terminology employing a "/" with respect to the chemical identity of a copolymer (e.g., ethylene/norbornene copolymer) identifies the comonomers which are copolymerized to produce the copolymer.

As used herein, the term "extrusion" refers to the process of forming continuous shapes by forcing a molten plastic material through a die, followed by cooling or chemical hardening.

As used herein, the terms "coextrusion" and "coextruded" refer to the process by which the resin outputs of two or more extruders are brought smoothly together in a feed block to form a multilayer stream that is fed to a die to produce a layered extrudate. Coextrusion can be employed in cast and blown film coextrusion methods.

As used herein, the phrase "blown film coextrusion" refers to a coextrusion process which includes an apparatus having a multi-manifold circular die head through which the film layers are forced and formed into a cylindrical multilayer film bubble. The bubble may be quenched, e.g., via cooled water bath, solid surface and/or air, and then ultimately collapsed and formed into a multilayer film. Films produced using blown film processes are known in the art and have been described, for example, in the *Encyclopedia of Chemical Technology*, Kirk-Othmer, 3rd ed., John Wiley & Sons, New York, 1981, Vol. 16, pp. 416-417 and Vol. 18, pp. 191-192, the disclosures of which are incorporated herein by reference. Typically, the resins and any additives forming one or more film layers are introduced to an extruder where the resins are melt-plastified by heating and then transferred to an extrusion (or coextrusion) die for formation into the bubble or tube. If desired, resins may be blended or mechanically mixed by well-known methods using commercially available equipment including tumblers, mixers or blenders, and well-known additives such as processing aids, slip agents, anti-blocking agents, pigments and mixtures thereof may be incorporated into the resin by blending prior to extrusion. The extruder and die temperatures will generally depend upon the particular resin(s) containing mixtures being processed, and suitable temperature ranges for commercially available resins are generally known in the art or are provided in technical bulletins made available by resin manufacturers. Processing temperatures may vary depending upon other processing parameters chosen. After formation, the bubble is cooled, collapsed and wound around a roller for further processing.

The terms "surface-treat" and "surface-treatment" both refer to any technique which alters the surface energy (or surface tension) of a film layer and may include techniques such as, but not limited to, corona, flame and plasma treatment, ozone, ultra-high frequency electrical discharge, UV or laser bombardment, chemical priming and the like. The phrase "corona treatment" refers to, in general, the process wherein an electrical discharge generated by a high-voltage electric field passes through a polymer substrate. It is believed that the electrical discharge or "corona" may ionize the oxygen molecules surrounding the substrate which then chemically interact with the surface atoms of the substrate thereby changing the surface energy of the polymer substrate.

As used herein, the phrase "non-oriented multilayer film" refers to a multilayered film structure that is substantially free of post-formation orientation. It is known by those skilled in the art that post-extrusion orientation will significantly affect a film's tensile properties. Tensile properties may include, for example, but are not limited to, tensile strength at yield, tensile strength at break (or ultimate tensile strength), tensile modulus (or Young's modulus) and percent elongation at yield and break.

The phrase "secant modulus" refers to an approximation of the elastic modulus or Young's modulus of a plastic film specimen. Secant modulus is defined as the slope of a line from the origin of a curve (zero strain) to a specific strain point of the stress-strain curve. Procedures for measuring secant modulus of plastic film are set forth in ASTM D 882 Standard Test Method for Tensile Properties of Thin Plastic Sheeting, which is incorporated herein by reference. For purposes of the present invention, secant modulus is measured at 1% and 2% strain.

The phrase "elongation at break" refers to the extension, i.e., lengthening or stretching, produced by a tensile stress at the moment of rupture of a plastic film specimen. Elongation at break is often expressed as a percentage of the original length of the specimen. Procedures for measuring elongation at break of plastic film are set forth in ASTM D 882 Standard Test Method for Tensile Properties of Thin Plastic Sheeting, which is incorporated herein by reference.

As used herein, the phrase "ethylene/norbornene copolymer" refers to a class of polymeric materials based on cyclic olefin monomers and ethane. Ethylene/norbornene copolymers are known commercially as cyclic olefin copolymers, "COC," with one or more different cyclic olefin units randomly or alternately attached to the ethylene polymer backbone. In general, COCs exhibit a high glass transition temperature (greater than 50° C.), optical clarity, low heat shrinkage, low moisture absorption and low birefringence. These materials may be produced by a number of polymerization techniques which may include chain polymerization of cyclic monomers such as 8,9,10-trinorborn-2-ene (norbornene) of 1,2,3,4,4a,5,8,8a-octa-hydro-1,4:5,8-dimethanonaphthalene (tetracyclododecene) with ethane; or ring-opening metathesis of various cyclic monomers followed by hydrogenation.

As used herein, the phrase "ethylene/vinyl alcohol copolymer" and the term "EVOH" both refer to polymerized ethylene vinyl alcohol. Ethylene/vinyl alcohol copolymers include saponified (or hydrolyzed) ethylene/vinyl acrylate copolymers and refer to a vinyl alcohol copolymer having an ethylene comonomer prepared by, for example, hydrolysis of vinyl acrylate copolymers or by chemical reactions with vinyl alcohol. The degree of hydrolysis is, preferably, at least 50% and, more preferably, at least 85%. Preferably, ethylene/vinyl alcohol copolymers comprise from about 28-48 mole % ethylene, more preferably, from about 32-44 mole % ethylene, and, even more preferably, from about 38-44 mole % ethylene.

As used herein, the term "polyamide" refers to homopolymers or copolymers having an amide linkage between monomloer units which may be formed by any method known to those skilled in the art. In general, polyamides may include materials characterized as being crystalline, semi-crystalline and amorphous. The phrase "amorphous polyamide" refers to polyamides or nylons with an absence of a regular three-dimensional arrangement of molecules or sub-units of molecules extending over distances which are large relative to atomic dimensions. However, regularity of structure exists on a local scale. See, "Amorphous Polymers," in *Encyclopedia of Polymer Science and Engineering,* 2nd Ed., pp. 789-842 (J. Wiley & Sons, Inc. 1985), which is incorporated herein by reference. In particular, an amorphous polyamide is a material generally recognized by one skilled in the art by differential scanning calorimetry (DSC) as having no measurable melting point (less than 0.5 calories/g) or no heat of fusion as measured by DSC using ASTM 3417-83, which is incorporated herein by reference. In contrast, crystalline and semi-crystalline polyamides can be identified as having at least one melting point or heat of fusion as measured by differential scanning calorimetry. Useful polyamide homopolymers include nylon 6 (polycaprolactam), nylon 11 (polyundecanolactam), nylon 12 (polylauryllactam) and the like. Other useful polyamide homopolymers also include nylon 4,2 (polytetramethylene ethylenediamide); nylon 4,6 (polytetramethylene adipamide); nylon 6,6 (polyhexamethiylene adipamide); nylon 6,9 (polyhexamethylene azelamide); nylon 6,10 (polyhexamnethylene sebacamide); nylon 6,12 (polyhexamethylene dodecanediamide); nylon 7,7 (polyheptamethylene pimelamide); nylon 8,8 (polyoctamethylene suberamide); nylon 9,9 (polynonamethylene azelamide); nylon 10,9 (polydecamethylene azelamide); nylon 12,12 (polydodecamethylene dodecanediamide); and the like. Useful polyamide copolymers include nylon 6, 6/6 copolymer (polyhexamethylene adipamide/caprolactam copolymer), nylon 6/6, 6 copolymer (polycaprolactam/hexamethylene adipamide copolymer); nylon 6, 2/6, 2 copolymer (polyhexamethylene ethylenediamide/hexamethylene ethylenediamide copolymer); nylon 6, 6/6, 9/6 copolymer (polyhexamethylene adipamide/hexamethylene azelaiamide/caprolactam copolymer), as well as other nylons which are not particularly delineated here. Exemplary of even more suitable polyamides include nylon 4, 1; nylon 6, 1; nylon 6, 6/61 copolymer; nylon 6, 6/6T copolymer; MXD6 (poly-m-xylylene adipamide); nylon 6T/6I copolymer; nylon 6/MXDT/I copolymer; nylon MXDI; poly-p-xylylene adipamide; polyhexamethiylene terephthalamide; polydodecamethylene terephthalamide; and the like. Commercially available polyamides include resins sold under the trademark Ultramid®, particularly, the crystalline 6/6,6 copolyamide identified as Ultramid® C33 01 having a melting point of 195 to 197° C. and a density of 1.12 g/cm$^3$ which is sold by BASF Aktiengesellschaft, Ludwigshafen, Germany.

As used herein, the term "polyolefin" refers to homopolymers and copolymers, including, e.g. bipolymers, terpolymers, etc., having a methylene linkage between monomer units which may be formed by any method known to those skilled in the art. Suitable examples of polyolefins include polyethylenes (PE), such as low-density polyethylene (LDPE), medium-density polyethylene (MDPE) and high-density polyethylene (HDPE); polyethylenes comprising copolymers of ethylene with one or more α-olefins such as butene-1, hexene-1, octene-1 or the like as a comonomer, such as linear low-density polyethylene (LLDPE), very low-density polyethylene (VLDPE) and ultra low-density polyethylene (ULDPE); ethylene/propylene copolymers; polypropylene; propylene/ethylene copolymer; polyisoprene; polybutylene; polybutene; poly-3-methylbutene-1; poly-4-methylpentene-1; ionomers; and the like. Exemplary of commercially available polyethylenes include, for example, HDPE resins such as those sold under the trademark Alathon®, particularly, Alathon® M6020 having a density of 0.960 g/cm$^3$ and a melt index of 2.0 g/10 min., which can be obtained from Lyondell Chemical Company, Houston, Tex., U.S.A.; and LDPE resins such as those sold Linder the trademark Equistar Petrothene®, particularly, Equistar Petrothene® NA 216-000 having a density of 0.923 g/cm$^3$ and a melt index of 3.7 g/10 min., which can be obtained from Equistar Chemical Company, Houston, Tex., U.S.A.

As used herein, the phrase "metallocene-catalyzed polyethylene," identified herein as "m-PE," "m-VLDPE," m-LLDPE," "m-MDPE" and the like, refers to any polyethylene formed by co-polymerization reactions with metallocene catalysis systems which include constrained geometry catalysts, i.e., monocyclopentadienyl transition-metal complexes taught in U.S. Pat. No. 5,026,798 to Canich, which is incorporated herein by reference. Metallocene-catalyzed polyethylenes may be characterized by one or more methods known to those skilled in the art, such as molecular weight distribution (Mw/Mn), composition distribution breadth index (CDBI), narrow melting point range and single melt point behavior. The molecular weight distribution (Mw/Mn), also known as "polydispersity," can be determined by gel permeation chromatography (GPC) where Mw is defined as the weight-average molecular weight and Mn is defined as the number-average molecular weight. The molecular weight determination of polymers and copolymers can be measured as outlined in ASTM D-3593-80, which is incorporated herein in its entirety by reference. Metallocene-catalyzed polyethylenes suitable for use in the present invention may be homogeneous catalyzed copolymers of ethylene and an α-olefin which may have a Mw/Mn of less than 2.7; more preferably, from about 1.9 to 2.5, and, still more preferably, from about 1.9 to 2.3. An α-olefin is defined as a comonomer having 3-20 pendant carbon atoms; preferably, 3-12 pendant carbon atoms; and, more preferably, 3-6 pendant carbon atoms. The composition distribution breadth index (CDBI) of the homogeneous catalyzed copolymers of ethylene and an α-olefin will generally be greater than 70%. This is contrasted with heterogeneous catalyzed copolymers of ethylene and an α-olefin which may have a broad composition distribution index of generally less than 55%. The CDBI is defined as the weight percent of the copolymer molecules having a comonomer content within 50 percent (i.e., plus or minus 50%) of the median total molar comonomer content. The composition distribution breadth index (CDBI) may be determined via the technique of temperature rising elution fractionation (TREF) as described by Wild, et al., Journal of Polymer Science, Poly. Phys Ed., Vol. 20, p. 441 (1982) and U.S. Pat. No. 4,798,081, which are both incorporated herein, in their entireties, by reference. Examples of commercially available metallocene-catalyzed polyethylenes (m-PE) include metallocene-catalyzed medium-density polyethylenes (m-MDPE) such as those having a density of 0.934 g/cm$^3$, a melt index of 0.9 g/10 min. and a melting point of 124° C. and sold by Total Petrochemicals USA, Inc. Houston, Tex., U.S.A.

As used herein, the tents "polylactic acid" and "polylactide" are used synonymously to refer to homopolymers or copolymers having an ester linkage between monomer units and can be represented by the general formula [—OCH(R)C(O)—]$_n$, where R—CH$_3$. Polylactic acid may be fabricated by polymerizing lactic acid, which is mostly produced by carbohydrate fermentation of corn. Polylactic acid may be also produced by polymerization of lactide which is obtained by condensation of two lactic acid molecules. Polylactic acid has a glass transition temperature ranging from 50-80° C., while the melting temperature ranges from 130-180° C. Polylactic acid is known by those skilled in the art and fully disclosed in U.S. Pat. Nos. 5,698,322; 5,142,023; 5,760,144; 5,593,778; 5,807,973; and 5,010,145, of which the entire disclosure of each is hereby incorporated by reference. Examples of commercially available polylactic acid are sold under the trademark NatureWorks* PLA Polymer in grades 4031-D, 4032-D and 4041-D from Cargill Dow LLC, Minneapolis, Minn., U.S.A.

As used herein, the term "anhydride-modified" refers to any form of anhydride functionality, such as the anhydride of maleic acid, fumaric acid, etc., whether co-polymerized with an anhydride-containing monomer or with a second, different monomer grafted onto a polymer or copolymer or blended with one or more polymers, and is inclusive of derivatives of such functionalities, such as acids, esters, and metal salts derived therefrom. In accordance with the present invention, examples of suitable anhydride-modified materials include, but are not limited to, anhydride-modified ethylene/vinyl acetate copolymer (mod-EVA) and anhydride-modified polyolefins, preferably, an anhydride-modified polyethylene copolymer (mod-PE) having 0.05-1% by weight of maleic anhydride and 99-99.95% by weight of polyolefin relative to the total weight of said anhydride-modified polyolefin. Those skilled in the art will recognize that anhydride-modified materials may serve as an appropriate adhesive or the material in the preparation of coextruded films or packaging webs. An example of a commercially available anhydride-modified polyethylene copolymer (mod-PE) may include resins sold under the trademark Bynel®, particularly, Bynel® 41E712 which has a melt index of 1.5 g/10 min., a melting point of 125° C. and can be obtained from E.I. dePont de Nemours and Company, Wilmington, Del., U.S.A., and those sold under the trademark Plexar®, particularly, Plexar® PX3308 having a melt index of 4.0 g/10 min., a melting point of 127° C. and a density of 0.939 g/cm$^3$, which available from Equistar Chemicals, LP, Houston, Tex., U.S.A.

As used herein, the phrase "regenerated cellulose" refers to a film produced from wood pulp by the viscose process. Regenerated cellulose may also be referred to as cellophane.

As used herein, the phrase "metal coating" (which when applied forms the metal layer) refers to a coating that may be applied to one or both surfaces of a film by any known method such as sputtering, vacuum deposition or electroplating (all of which fall within the definition of "metallizing" the film and involve some act or method of "depositing" a continuous metal, metal oxide or metal alloy layer onto the surface of a polymer substrate). The metal used can vary, though aluminum, zinc, gold, silver or appropriate alloys of such are preferred, with aluminum or aluminum-containing alloys being particularly preferred. As will be recognized by those skilled in the art, while the metal coating predominantly consists of the identified metal (such as aluminum), amounts of other additives may be present to improve assorted physical and optical properties of the deposited metal layer. In some occasions, pure aluminum (or the metal of choice) may be used. Other additives maybe used in minor amounts such that aluminum (or the metal of choice) is the major component. Vacuum deposition is a preferred method of metallization in tends of processing and cost. Preferred values for the average thickness of the metal coating layer are within the range of about 1.0 to 100 nanometers, with the preferred average thickness being within the range of about 3 to 25 nanometers. (1 micron equals 10$^{-7}$ meters, and 1 nanometer equals 10$^{-8}$ meters.) Regardless, the metal coating preferably has a thickness less than the polymer substrate on which it is deposited, preferably substantially less than said substrate. In contrast, typical metal foils used in packaging film application have a thickness of between 4.3 to 150 microns, as noted in "Foil, Aluminum" in *The Wiley Encyclopedia of Packaging Technology*, 2$^{nd}$. Ed., by Foil Division of the Aluminum Association, Inc., pp. 458-463, which is incorporated herein by reference. For an aluminized coating layer, the key conditions are optical density (metal deposition) of approximately 0.75 to 4, preferably 1.0-3.0.

As used herein, the phrase "sealant film" refers to a portion of the packaging web surface (i.e., formed from a single layer or multiple layers) which is capable of forming a fusion bond to a second portion of a film or packaging web surface. A sealant film is capable of fusion bonding by conventional, indirect heating means which generate sufficient heat on at least one film contact surface for conduction to the contiguous film contact surface and formation of a bond interface therebetween without loss of the film integrity. Those skilled in the art will appreciate that the bond interface between contiguous inner layers preferably has sufficient physical strength to withstand the packaging process and subsequent handling, including, for example, tensions resulting from stretching or shrinking attendant with the presence of a food body sealed within a package utilizing a sealant film. Advantageously, the bond interface is preferably sufficiently thermally stable to prevent gas or liquid leakage therethrough when exposed to above or below ambient temperatures, such as those during packaging operations, storage, handling, transport, display or processing of food. Heat seals may be designed to meet different conditions of expected use, and various heat seal formulations are known in the art and may be employed with the present disclosure. For use in cook-in applications, heat seals should withstand elevated temperatures up to about 160-180° F. (71-82° C.) or higher, for example, 212° F. (100° C.), for extended periods of time, such as up to 4 to 12 hours in environments which may range from heated humidified air to steam to submersion in heated water. Preferably, the sealant layer is heat sealable to itself, but may be sealable to other objects, films or layers, such as to a tray when used as a lidding film or to an outer layer in a lap seal or in certain tray overwrap embodiments. Also, in certain embodiments, the sealing layer is also a food contact layer. In other embodiments, the sealant layer may be adapted to provide a peelable bond interface between film surfaces without the loss of sufficient physical strength. Methods of forming a peelable bond interface in packaging films using a sealant layer or in combination with other layers are known in the art and have been described in, for example, U.S. Pat. No. RE37,171 to Busche et al. and U.S. Patent Application Publication No. 2006/0269707 to Berbeit, which are both incorporated herein by reference. In still other embodiments, the sealant film may be further adapted to provide a peelable and resealable bond interface. Exemplary of known peelable and resealable sealant and film layers include those structures described in U.S. Patent Application Publication Nos. 2006/0172131 to Haedt et al. and 2007/0082161 to Cruz et al., which are both incorporated herein by reference.

Those skilled in the art will recognize that a packaging web may be described in terms of its "peel strength," which refers to the force required to separate at least a portion of the interface between two adjoining film surfaces after the film has been sealed to a target substrate. One method for determining peel strength is ASTM F-904 test method entitled "Standard Test Method for Comparison of Bond Strength or Ply Adhesion of Similar Packaging Webs Made from Flexible Materials" published by ASTM International, West Conshohocken, Pa., U.S.A., which is incorporated herein by reference.

Although specific embodiments of the present invention will now be described with reference to the drawings, it should be understood that such embodiments are by way of example only and merely illustrative of but a small number of the many possible specific embodiments which can represent applications of the principles of the present invention.

Detailed Description of the Invention

The present invention is directed to flexible packaging webs having a metallized non-oriented coextruded sealant film. One method to distinguish between oriented and non-oriented webs is to measure relative tensile properties before and after orientation. For instance, U.S. Patent Application Publication No. 2005/0287359 to Breese, which is incorporated herein by reference, demonstrates the influence of post-formation orientation on tensile properties, for example, of a 6 mil monolayer film of high density polyethylene. In particular, Breese teaches that with increasing film orientation (in the machine direction), modulus increases and percent elongation at break decreases (in the machine direction) relative to non-oriented film samples. The sealant films of the present invention are non-oriented and have tensile properties which reflect no post-formation orientation. Preferably, the non-oriented sealant films of the present invention exhibit a secant modulus of less than 120,000 psi and an elongation at break of greater than 150%. By contrast, oriented films have a secant modulus greater than 120,000 psi and an elongation at break of less than 150%. For instance, biaxially oriented polyamide (OPA) films such as those marketed under the trademark Honeywell Capran®, particularly Honeywell Capran® Emblem™ 1000 have a secant modulus of 400,000 psi to 564,000 psi in tile machine direction (MD) and 385,000 psi to 537,000 psi in the transverse direction (TD) and an elongation at break of 65% to 90% in the machine direction (MD) and 55% to 90% in the transverse direction (TD). Biaxially oriented polyethylene terephthalate (OPET) films such as those marketed under the trademark Mylar® by Teijin DuPont Films Japan Limited, Tokyo, Japan, have a reported modulus of 550,000 psi and an elongation at break of 110% in the macline direction (MD) and 80% in the transverse direction (TD). Biaxially oriented polypropylene films (OPP) such as those available from ExxonMobil Chemical Company have a reported modulus of 343,000 psi in the machine direction and 687,000 psi in the transverse direction.

FIG. 1 depicts a partial cross-sectional diagram of one embodiment of a metallized non-oriented coextruded sealant film 10 in accordance with the present invention. Film 10 is shown comprising at least a thermoplastic base layer 11, a metal coating 12 deposited on a surface of base layer 11 and a heat sealing layer 13. Base layer 11 may comprise any natural or synthetic thermoplastic material, preferably polyolefins such as polyethylene; polypropylene; polybutylene; polyethylene copolymers which include but are not limited to ethylene/α-olefins, ethylene/vinyl alcohol copolymers (EVOH), ethylene/norbornene copolymers (COC), ethylene/vinyl acetate (EVA) and ethylene/acrylic acid copolymers (EAA); polyamides, in particular, amorphous polyamides; polyesters such as polyethylene terephthalates (PET), polyethylene isophthalates and polyethylene naphthalates; polycarbonates; ionomers; and blends thereof. Examples of preferred ethylene/acrylic acid copolymers (EAA) include the Dow Primacor® family of resins, e.g., Dow Primacor® 1430 grade having a reported density of 0.938 g/cm$^3$, a melt flow of 5 g/10 min., a melting point of 96° C. and available from The Dow Chemical Company, Midland, Mich., U.S.A. In a more preferred embodiment, base layer 11 may comprise ethylene/vinyl alcohol copolymers (EVOH), ethylene/norbornene copolymers (COC), amorphous polyamides and blends thereof. Examples of commercially available ethylene/vinyl alcohol (EVOH) copolymers suitable for use in the present invention include, but are not limited to, the SOARNOL® family of resins, e.g., SOARNOL® ET3803 grade having a reported bulk density of 0.64-0.74 g/cm$^3$, a relative density of 1.13-1.22 g/cm$^3$, a melting point of 164-188° C., an ethylene content of 38 mole % and available from Thle Nippon Synthetic Chemical Industry Company, Ltd. (Nippon Gohsei), Osaka, Japan. Examples of preferred ethylene/norbornene copolymers suitable for use in the present invention include, but are not limited to, those commercially available and marketed under the trademarks APEL™ by Mitsui Chemicals America, Inc, Rye Brook, New York, U.S.A., ARTON™ by JSR Corporation (formerly Japan Synthetic Rubber, Ltd.), Chiba, Japan; and TOPAS® by TOPAS Advanced Polymers GmbH, Frankfurt-Höchst, Germany. A more preferred example of the TOPAS® family of resins includes TOPAS® 8007 which has a glass transition temperature of 136° C., a density of 1.02 g/cm$^3$ and a water absorption of 0.01% at 23° C. and 100% relative humidity. Examples of commercially available preferred amorphous polyamides suitable for use in the present invention include, but are not limited to, resins sold under the trademark DuPont™ Selar® by E.I. de Pont de Nemours and Company, Wilmington, Del., U.S.A. An example of a more preferred polyamide includes DuPont™ Selar® PA 3426 which is a nylon 61/6T copolymer having a density of 1.19 g/cm$^3$ and a glass transition temperature of 125° C. Preferably, base layer 11 has a total thickness of between 0.05 to 10 mils.

Metal coating 12 may be deposited onto one or more surfaces of base layer 11 by any conventional metal deposition method known by those skilled in the art. Metal coating 12 may comprise any metal, metal oxide or metal alloy, and, preferably, is an aluminum or aluminum alloy. Preferably, a vacuum-vapor deposition technique is used to apply a layer of aluminum or aluminum alloy onto a surface of base layer 11. Preferably, metal coating 12 has a thickness of between 1.0 to 100 nanometers.

As depicted in the drawings, heat sealing layer 13 is positioned adjacent to base layer 11 and may comprise any heat sealable material desired. Preferably, heat sealing layer 13 comprises a polyolefin, for example, polyethylene, ionomer, polyester such as polyethylene terephthalate, or blends thereof. In a preferred embodiment, layer 13 comprises a polyethylene or polyethylene copolymer and, most preferably, comprises a low-density polyethylene (LDPE), a linear low-density polyethylene (LLDPE), a metallocene-catalyzed very low-density polyethylene (m-VLDPE), a metallocene-catalyzed linear low-density polyethylene (m-LLDPE), an ethylene/vinyl acetate copolymer or blends thereof. Examples of preferred low-density polyethylene (LDPE) include those supplied by The Dow Chemical Company, Midland, Mich., U.S.A., particularly, Dow Polyethylene 608A which has a density of 0.923 g/cm$^3$, a melt index of 2.60 g/10 min. and a melting point of 113° C. Non-limiting examples of commercially available LLDPE suitable for use in the present invention include those sold under the trademark Dowlex®, in particular, Dowlex® 2045G which has a density of 0.920 g/cm$^3$, a melt index of 1.0 g/10 min., a melting point of 122° C. and can be obtained from The Dow Chemical Company, Midland, Mich., U.S.A., and those marketed by ExxonMobil Chemical Company, e.g., ExxonMobil™ LLDPE LL1001 having a density of 0.918 g/cm$^3$, a melt index of 1.0 g/10 min. and a melting point of 120° C. Suitable m-LLDPE resins for use in the present invention include, but are not limited to, for example, those sold under the trademark Exact™, particularly Exact™ 3139 which is an ethylene/α-olefin copolymer having a density of 0.900 g/cm$^3$, a melt index of 7.5 g/10 min. and a melting point of 95° C. Suitable m-VLDPE resins include, for example, those sold under the trademark Exceed™, in particular, Exceed™ 1012CA which is an ethylene/α-olefin copolymer having a density of 0.912 g/cm$^3$, a melt index of 1.06 g/10 min. and a melting point of 116° C. The examples of m-LLDPE and m-VLDPE may each be obtained from ExxonMobil Chemical Company of Houston, Tex., U.S.A. Non-limiting examples of suitable commercially available ethylene/vinyl acetate copolymers include the DuPont™ Elvax® family of resins, particularly DuPont™ Elvax®3169Z which has a density of 0.95 g/cm$^3$, a melt index of 1.5 g/10 min., a melting point of 89° C., a vinyl acetate content of 18% by mole and is sold by E.I. de Pont de Neiilours and Company, Wilmington, Del., U.S.A.

It is also contemplated that the sealant film 10 may comprise any number of additional film layers as desired, including, for example, but not limited to, oxygen and moisture barrier layers, sealant layers, bulk layers and adhesive or tie layers.

In another embodiment, sealant film :10 further comprises a second sealant layer (not shown) which is in contact with the heat sealing layer 13 and positioned between heat sealing layer 13 and base layer 11. Preferably, the second sealant layer (not shown) comprises one or more antioxidants. Useful antioxidants in the present invention include, for example, Vitamin E, citric acid, ascorbic acid, ascorbyl palmitate, butylated phenolic antioxidants, tert-butylhydroquinone (TBHQ) and propyl gallate (PG). Preferably, the antioxidants used are butylated phenolic antioxidants including, for example, butylated hydroxyanisole (BHA) and butylated hydroxytoluene (BHT). Those skilled in the art recognize that antioxidants, particularly volatile antioxidants such as butylated hydroxyanisole (BHA) and butylated hydroxytoluene (BHT), can migrate out of a film during storage, reducing the amount of antioxidant remaining in the packaging film at the time the packaging material is actually used to package and store items, including but not limited to foodstuffs. It is believed that heat sealing layer 13 controls the migration of antioxidants through the second sealant layer and heat sealing layer 13 to the surface of sealant film 10, thus allowing sealant film 10 to retain a high percentage of the original amount of antioxidant.

Figure 2:
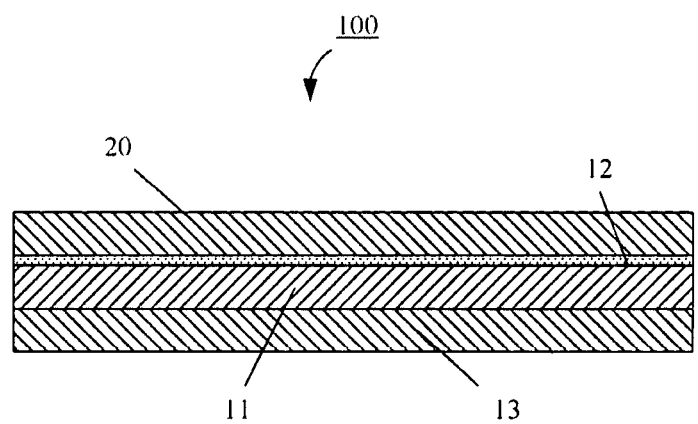
FIG. 2 is an illustration of a cross-sectional view of one embodiment of a two-ply packaging web according to the present invention.

In FIG. 2, there is illustrated another embodiment of the packaging web according to the present invention. Packaging web 100 comprises a metallized non-oriented coextruded sealant film 10 (as described above in FIG. 1, i.e., comprising thermoplastic base layer 11, metal coating 12 and heat sealing layer 13) and an oriented film 20. As depicted, oriented film 20 is positioned adjacent to the surface of metal coating 12 and opposite to base layer 11 and may or may not be in contact with metal coating 12. Oriented film 20 may comprise any oriented thermoplastic material as desired, and, preferably, includes an oriented polyethylene terephthalate, oriented polypropylene or oriented polyamide. It is noted that various combinations of additional layers and materials can be used in the formation of oriented film 20.

Figure 3:
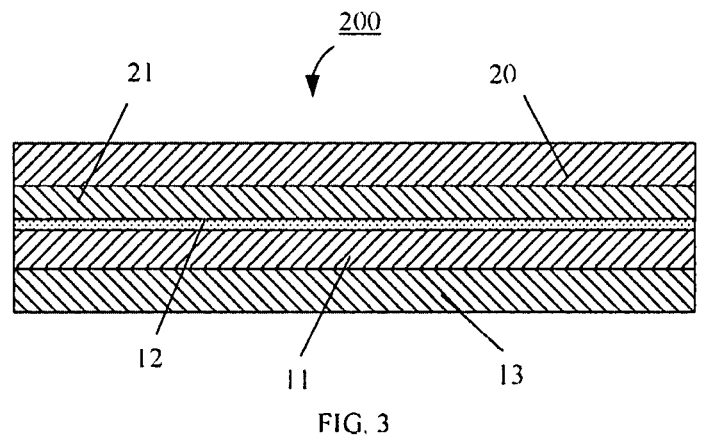
FIG. 3 is an illustration of a cross-sectional view of another embodiment of a two-ply packaging web according to the present invention.

FIG. 3 shows another embodiment of the present invention. As depicted, packaging web 200 comprises a metallized non-oriented coextruded sealant film 10 (comprising thermoplastic base layer 11, metal coating 12 and heat sealing layer 13), an oriented film 20 and a layer of adhesive 21. Preferably, oriented film 20 is a biaxially oriented polyethylene terephthalate (OPET) film. Adhesive layer 21 serves to affix film 20 to film 10. In one embodiment, adhesive 21 is a two-part polyurethane adhesive. Non-limiting examples of OPET films include those sold under the trademark Skyrol®, particularly a 48 gauge Skyrol® SP65 produced by SKC Co., Ltd., Seoul, South Korea.

Figure 4:
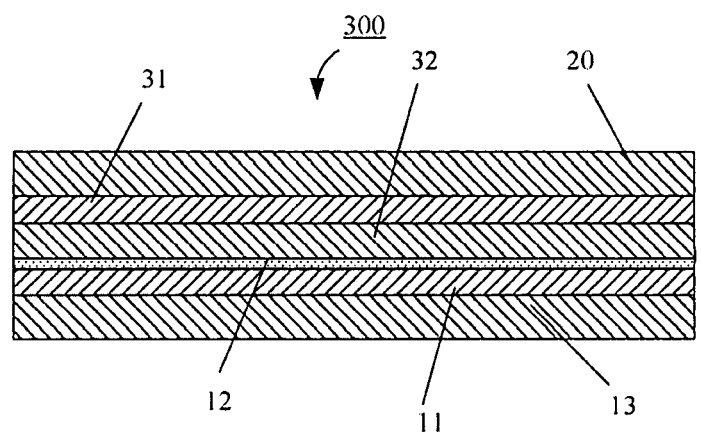
FIG. 4 is an illustration of a cross-sectional view of still another embodiment of a two-ply packaging web according to the present invention.

FIG. 4 illustrates still another embodiment of the present invention. Packaging web 300 includes a metallized non-oriented coextruded sealant film 10 (comprising thermoplastic base layer 11, metal coating 12 and heat sealing layer 13), an oriented film 20, a first intermediate layer 31 and a second intermediate layer 32. As shown, layer 31 is positioned between oriented film 20 and layer 32. In one embodiment, oriented film 20 is a biaxially oriented polyethylene terephthalate (OPET) film, layer 31 is a low-density polyethylene (LDPE) and layer 32 is an ethylene/acrylic acid copolymer (EAA). Layer 32 may serve to affix both film 20 and layer 31 to film 10.

1 In the practice of this invention, it may be desirable to surface-treat the exterior surface of either film 20 or film 10 prior to lamination.

EXAMPLE 1

A base layer of 100.00% by weight ethylene/vinyl alcohol copolymner (EVOH) was coextruded to a thickness of 0.125 mil together with a 0.125 mil thick adhesive (tie) layer of 100.00% by weight anhydride-niodified linear low-density polyethylene (mod-LLD.PE) and a 1.0 mil thick heat sealing (sealant) layer comprising 61.20% by weight linear low-density polyethylene (LLDPE), 33.50% by weight metallocene-catalyzed linear low-delisity polyethylene (m-LLDPE) and 5.30% by weight processing additives. The three layer film was coextruded using a blown film coextrusion method. The resulting non-oriented coextruded film had a total thickness of approximately 1.25 mils, was tested for tensile properties and then wound in roll form. The roll was then metallized by vapor-deposition of aluminum onto the exterior surface of the base layer to an optical density of 2.2. The metallized non-oriented coextruded film had the following structure: metal/EVOH/mod-LLDPE/LLDPE+m-LLDPE.

EXAMPLE 2

A base layer of 100.00% by weight ethylene/acrylic acid copolymer (EAA) was coextruded to a thickness of 0.26 mil together with a 0.14 mil thick layer comprising 56.10% by weight low-density polyethylene (LDPE), 25.00% by weight linear low-density polyethylene (LLDPE), 18.00% by weight of a low-density polyethylene color concentrate and 0.90% by weight processing additives, a 0.10 mil thick tie layer of 100.00% by weight anhydride-modified linear low-density polyethylene (mod-LLDPE), a 0.25 mil thick layer of 100.00% by weight ethylene/vinyl alcohol copolymer (EVOH), a 0.10 mil thick tie layer of 100.00% by weight anhydride-modified linear low-density polyethylene (mod-LLDPE), a 0.20 mil thick layer comprising 56.10% by weight low-density polyethylene (LDPE), 25.00% by weight linear low-density polyethylene (LLDPE), 18.00% by weight of a low-density polyethylene color concentrate and 0.90% by weight processing additives, and a 0.20 mil thick heat sealing layer (sealant) of 50.00% by weight metallocene-catalyzed linear low-denisity polyethylene (m-LLDPE), 42.20% by weight low-density polyethylene (LDPE) and 7.80% by weight of a linear low-density polyethylene processing additive mixture. The resulting non-oriented coextruded film had a total thickness of approximately 1.25 mils, was tested for tensile properties and then wound in roll form. The roll was then metallized by vapor-deposition of aluminum onto the exterior surface of the base layer to an optical density of 2.2. The metallized non-oriented coextruded film had the following structure: metal/EAA/LDPE+LLDPE/mod-LLDPE/EVOH/mod-LLDPE/LDPE+LLDPE/m-LLDPE+LDPE.

EXAMPLE 3

A base layer of 90.00% by weight ethylene/norbornene copolymer (COC) and 10.00% by weight linear low-density polyethylene (LLDPE) was coextruded to a thickness of 0.188 mils together with a 0.500 mil thick (bulk) layer of 100.00% by weight metallocene-catalyzed medium-density polyethylene (m-MDPE), a 0.188 mil thick layer of 90.00% by weight ethylene/norbornene copolymer (COC) and 10.00% by weight of linear low-density polyethylene (LLDPE), a 0.188 mil thick first sealing layer comprising 50.00% by weight of metallocene-catalyzed very low-density polyethylene (m-VLDPE), 27.00% by weight of ethylene/vinyl acetate copolymer (EVA) having an acetate content of 18% by mole, 20.00% by weight of a 90:10 mixture of polyethylene (PE) and butylated hydroxytoluene (BHT) and 3.00% by weight processing additives, and a 0.188 mil thick second sealing layer (heat sealing layer) of 60.00% by weight of metallocene-catalyzed very low-density polyethylene (m-VLDPE), 34.00% by weight of ethylene/vinyl acetate copolymer (EVA) having an acetate content of 18% by mole and 6.00% by weight of a mixture of processing additives. The five layer film was coextruded using a blown film coextrusion method. The resulting non-oriented coextruded film had a total thickness of approximately 1.25 mils, was tested for tensile properties and then wound in roll form. The roll was then metallized by vapor-deposition of aluminum onto the exterior surface of the base layer to an optical density target of 2.0. The metallized non-oriented coextruded film had the following structure: metal/COC+LLDPE/m-MDPE/COC+LLDPE/m-VLDPE+EVA+(PE+BHT)/m-VLDPE+EVA.

EXAMPLE 4

A base layer of 90.00% by weight ethylene/norbornene copolymer (COC) and 10.00% by weight of a linear low-density polyethylene (LLDPE) was coextruded to a thickness of 0.188 mils together with a 0.188 mil thick adhesive (tie) layer comprising 85.00% by weight linear low-density polyethylene (LLDPE) and 15.00% anhydride modified linear low-density polyethylene (mod-LLDPE), a 0.125 mil thick layer of 100.00% by weight crystalline 6/6,6 grade copolyamide (c-PA), a 0.188 mil thick adhesive (tie) layer of 85.00% by weight linear low-density polyethylene (LLDPE) and 15.00% anhydride modified linear low-density polyethylene (mod-LLDPE), a 0.188 mil thick layer comprising 98.00% by weight high-density polyethylene (HDPE) and 2.00% by weight of polymer additives (antioxidants, stabilizers, etc.), a 0.188 mil thick first sealing layer of 50.00% by weight of metallocene-catalyzed very low-density polyethylene (m-VLDPE), 27.00% by weight of ethylene/vinyl acetate copolymer (EVA) having an acetate content of 18% by mole, 20.00% by weight of a 90:10 mixture of polyethylene (PE) and butylated hydroxytoluene (BHT) and 3.00% by weight processing additives, and a 0.188 mil thick second sealing layer (heat sealing layer) of 60.00% by weight metallocene-catalyzed very low-density polyethylene (m-VLDPE), 34.00% by weight of ethylelle/vinyl acetate copolyiner (EVA) having an acetate content of 18% by mole and 6.00% by weight of a mixture of processing additives. The seven layer film was coextruded using a blown film coextrusion method. The resulting non-oriented coextruded film had a total thickness of approximately 1.25 mils, was tested for tensile properties and then wound in roll form. The roll was then metallized by vapor-deposition of aluminum onto the exterior surface of the base layer to an optical density target of 2.0. The metallized non-oriented coextruded film had the following structure: metal/COC+LLDPE/LLDPE+mod-LLDPE/c-PA/LLDPE+mod-LLDPE/HDPE/m-VLDPE+EVA+(PE+BHT)/m-VLDPE+EVA.

The tensile properties of the non-metallized films in Examples 1 to 4 were measured in an Instron Tensile tester. Tensile values were determined in both the machine direction (MD) and transverse direction (TD). Secant modulus at 1% and 2% and elongation at break were tested substantially in accordance with ASTM D 822. A 2" initial grip separation was used for this measurement. Initially, the films were pulled at a rate of 0.5 in/min; then at a 4% strain, the speed changed to a rate of 20 in/min and pulled until the films broke. The results are reported in Table 1.

TABLE 1

Comparison of Tensile Properties

| | Example 1 | Example 2 | Example 3 | Example 4 |
|---|---|---|---|---|
| MD 1% Secant Modulus (psi) | 74,733 | 97,867 | 97,188 | 77,273 |
| TD 1% Secant Modulus (psi) | 70,331 | 103,445 | 95,611 | 88,181 |
| MD 2% Secant Modulus (psi) | 62,976 | 83,036 | 85,643 | 68,853 |
| TD 2% Secant Modulus (psi) | 63,429 | 85,088 | 82,912 | 75,464 |
| MD Elongation (%) | 185 | 197 | 175 | 244 |
| TD Elongation (%) | 346 | 360 | 255 | 313 |

EXAMPLE 5

A metallized non-oriented coextruded sealant film as described in Example 1 was laminated to a 48 gauge biaxially oriented polyethylene terephthalate film by an adhesive lamination method. The resulting two-ply flexible packaging web had the following structure: 48 gauge OPET/adhesive/metal/EVOH/mod-LLDPE/LLDPE+m-LLDPE.

EXAMPLE 6

A metallized non-oriented coextruded sealant film as described in Example 1 was laminated to a corona treated anchor-coated 48 gauge biaxially oriented polyethylene terephthalate film by an extrusion lamination method. The resulting two-ply flexible packaging web had the following structure: 48 gauge OPET/LDPE/EAA/metal/EVOH/mod-LLDPE/LLDPE+m-LLDPE.

EXAMPLE 7

A process similar to Example 5 was repeated except that a metallized non-oriented coextruded sealant film as described in Example 2 was laminated to a 48 gauge biaxially oriented polyethylene terephthalate film. The resulting two-ply flexible packaging web had the following structure: 48 gauge OPET/adhesive/metal/EAA/LDPE-+LLDPE/mod-LLDPE/EVOH/mod-LLDPE/LDPE+LLDPE/m-LLDPE+LDPE.

EXAMPLE 8

A process similar to Example 6 was repeated except that a metallized non-oriented coextruded sealant film as described in Example 2 was laminated to a 48 gauge biaxially oriented polyethylene terephthalate film. The resulting two-ply flexible packaging web had the following structure: 48 gauge OPET/LDPE/EAA/metal/EAA/LDPE+LLDPE/mod-LLDPE/EVOH/mod-LLDPE/LDPE+LLDPE/m-LLDPE+LDPE.

EXAMPLE 9

A process similar to Example 5 was repeated except that a metallized non-oriented coextruded sealant film as described in Example 3 was laminated to a 48 gauge biaxially oriented polyethylene terephthalate film. The resulting two-ply flexible packaging web had the following structure: 48 gauge OPET/adhesive/metal/COC+LLDPE/m-MDPE/COC+LLDPE/m-VLDPE+EVA+(PE+BHT)/m-VLDPE+EVA.

EXAMPLE 10

A process similar to Example 5 was repeated except that a metallized non-oriented coextruded sealant film as described in Example 4 was laminated to a 48 gauge biaxially oriented polyethylene terephthalate film. The resulting two-ply flexible packaging web had the following structure: 48 gauge OPET/adhesive/metal/COC+LLDPE/LLDPE 30 mod-LLDPE/c-PA/LLDPE+mod-LLDPE/HDPE/m-VLDPE+EVA+(PE+BHT)/m-VLDPE+EVA.

EXAMPLE 11

A process similar to Example 5 was repeated except that a metallized non-oriented coextruded sealant film as described in Example 4 was laminated to an oriented polypropylene film. The resulting two-ply flexible packaging web had the following structure: OPP/adhesive/metal/COC+LLDPE/LLDPE+mod-LLDPE/c-PA/LLDPE+mod-LLDPE/HDPE/m-VLDPE+EVA+(PE+BHT)/m-VLDPE+EVA.

COMPARATIVE EXAMPLE 1

A process similar to Example 5 was repeated except that a 28 micron thick metallized oriented polypropylene sealant film was laminated to a 48 gauge biaxially oriented polyethylene terephthalate film. The metallized oriented sealant film was an OPP film identified as Metallyte® X-28 UBW-ES and obtained from ExxonMobil Chemical, Houston, Tex., U.S.A. The resulting two-ply flexible packaging web had the following structure: 48 gauge OPET/adhesive/28 micron thick metallized OPP sealant.

COMPARATIVE EXAMPLE 2

A process similar to Example 5 was repeated except that a 40 micron thick metallized oriented polypropylene sealant film was laminated to a 48 gauge biaxially oriented polyethylene terephthalate film. The metallized oriented sealant film was an OPP film identified as Metallyte® X-40 UBW-ES and obtained from ExxonMobil Chemical, Houston, Tex., U.S.A. The resulting two-ply flexible packaging web had the following structure: 48 gauge OPET/adhesive/40 micron thick metallized OPP sealant.

COMPARATIVE EXAMPLE 3

A process similar to Example 5 was repeated except that a 140 micron thick metallized oriented polypropylene sealant film was laminated to a 48 gauge biaxially oriented polyethylene terephthalate film. The metallized oriented sealant film was an OPP film identified as Treofan® QCM™ and obtained from Treofan Group, Raunheim, Germany. The resulting two-ply flexible packaging web had the following structure: 48 gauge OPET/adhesive/140 micron thick metallized OPP sealant.

COMPARATIVE EXAMPLE 4

A process similar to Example 6 was repeated except that a 28 micron thick metallized oriented polypropylene sealant film was laminated to a 48 gauge biaxially oriented polyethylene terephthalate film. The metallized oriented sealant film was an OPP film identified as Metallyte® X-28 UBW-ES and obtained from ExxonMobil Chemical, Houston, Tex., U.S.A. The resulting two-ply flexible packaging web had the following structure: 48 gauge OPET/LDPE/EAA/28 micron thick metallized OPP sealant.

COMPARATIVE EXAMPLE 5

A process similar to Example 6 was repeated except that a 40 micron thick metallized oriented polypropylene sealant film was laminated to a 48 gauge biaxially oriented polyethylene terephthalate film. The metallized oriented sealant film was an OPP film identified as Metallyte® X-40 UBW-ES and obtained from ExxonMobil Chemical, Houston, Tex., U.S.A. The resulting two-ply flexible packaging web had the following structure: 48 gauge OPET/LDPE/EAA/40 micron thick metallized OPP sealant.

Oxygen transmission rate ($O_2$TR) and water vapor transmission (WVTR) of Examples 5 to 11 and Comparative Examples 1 to 5 were measured. Oxygen transmission rate was determined by using Mocon Oxtran® Oxygen Permeability Tester Models 2/20 and 2/21 substantially in accordance with ASTM D 3985, which is incorporated herein by reference. Oxygen transmission rate is reported in cm$^3$/100 in$^2$/24 hours (cm$^3$/645.16 cm$^2$/24 hours). Water vapor transmission was determined by using a Mocon Permatran W® 3/31 Water Vapor Transmission Tester substantially in accordance with ASTM F 1249, which is incorporated herein by reference. Water vapor transmission is reported in g/100 in$^2$/24 hours (g/645.16 cm$^2$/24 hours). The results of the foregoing examples ("Ex.") and comparative examples ("CEx.") are shown in Table 2.

TABLE 2

Comparison of Barrier Properties

| | Thickness of samples (mil)/(mil) | O$_2$TR at 0% R.H. and 23° C. | | WVTR at 90% R.H. and 38° C. | |
|---|---|---|---|---|---|
| Ex. 5 | 1.80/1.80 | 0.00110 | 0.02920 | 0.10810 | 0.11950 |
| Ex. 6 | 2.50/2.40 | 0.00822 | 0.00605 | 0.00980 | 0.01170 |
| Ex. 7 | 1.70/1.70 | 0.11000 | 0.10000 | 0.02100 | 0.01300 |
| Ex. 8 | 2.30/2.20 | 0.23000 | 0.23000 | 0.05800 | 0.02900 |
| Ex. 9 | 1.68 | 0.80000 | | 0.01100 | |
| Ex. 10 | 1.98 | 0.32000 | | 0.01940 | |
| Ex. 11 | 2.04 | 0.36000 | | 0.01840 | |
| CEx. 1 | 1.60/1.60 | 0.07160 | 0.02130 | 0.02990 | 0.02490 |
| CEx. 2 | 2.00/2.00 | 0.04000 | 0.08200 | 0.02000 | 0.01200 |
| CEx. 3 | 1.90/1.90 | 0.20000 | 0.18000 | 0.00900 | 0.00890 |
| CEx. 4 | 2.10/2.20 | 0.23830 | 0.21290 | 0.06290 | 0.05190 |
| CEx. 5 | 2.30/2.40 | 0.15000 | 0.21000 | 0.00800 | 0.00750 |

The heat seal strengths of Examples 5, 6, 7 and 9 and Comparative Examples 1 to 4 were measured using a Packaging Industries, Inc., Model 12AS Heat Sealer and a Tinius Olsen Tensile tester. Prior to testing, each packaging web of Examples 5, 6 and 9 and Comparative Examples 1 and 4 were heat sealed to itself. Examples 7 and Comparative Examples 2 and 3 were each heat sealed to polyethylene film prior to testing. Heat sealing was accomplished by using a 1.0 inch seal bar at a bar pressure of between 30 psi to 40 psi and a dwell time of 1 second. The heat seal strengths were determined between 180° F. (82° C.) to 320° F. (160° C.) substantially in accordance with ASTM F 88-94 and D 952, both of which are incorporated herein by reference. Heat seal strength is reported in grams per inch (1 g/2.54 cm). The results if the foregoing examples ("Ex.") and comparative examples ("CEx.") are shown in Table 3 below.

TABLE 3

Comparison of Heat Seal Strength

| Temp. (° F.) | Ex. 5 | Ex. 6 | Ex. 7 | Ex. 9 | CEx. 1 | CEx. 2 | CEx. 3 | CEx. 4 |
|---|---|---|---|---|---|---|---|---|
| 180 | 0 | 0 | 0 | 0 | 0 | 0 | 0 | 0 |
| 200 | 0 | 479 | 0 | 304 | 349 | 0 | 0 | 538 |
| 220 | 2149 | 3571 | 0 | 1960 | 829 | 0 | 0 | 1289 |
| 240 | 2628 | 4654 | 151 | 2622 | 1212 | 5 | 4 | 1349 |
| 260 | 2613 | 5481 | 2912 | 2919 | 1764 | 91 | 53 | 1864 |
| 280 | 2605 | 5947 | 3720 | 3249 | 1829 | 245 | 314 | 1881 |
| 300 | 3571 | 5644 | 3720 | 3205 | 1695 | 706 | 649 | 1864 |
| 320 | 3763 | 6316 | 4087 | — | 1641 | 776 | 698 | 1562 |

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

What is claimed is:

1. A flexible packaging web
   (a) comprising a non-oriented sealant film characterized by a secant modulus of less than 120,000 psi and an elongation at break of greater than 150%, wherein the non-oriented sealant film is a coextruded blown film, wherein the non-oriented sealant film comprises a thermoplastic base layer of a material selected from the group consisting of ethylene/vinyl alcohol copolymer, ethylene/norbornene copolymer, ethylene/acrylic acid copolymer, polyamide and blends thereof and a heat sealing layer of a material selected from the group consisting of polyethylene, polyethylene copolymer, ionomer and blends thereof, and wherein the base layer of the non-oriented sealant film has a metal coating deposited thereon having a thickness of between 1.0 to 100 nanometers and an optical density of 1.0 to 3.0 which renders the entire surface of the non-oriented sealant film opaque;
   (b) further comprising an oriented film comprising polyethylene terephthalate, polypropylene, polyamide or polylactic acid, or a film of paper or regenerated cellulose; and
   (c) wherein the packaging web has an oxygen gas transmission rate of between 0 to 10.0 cm$^3$/100 in$^2$/24 hours at 73° F. (0 to 155 cm$^3$/m$^2$/24 hours at 23° C.) and 0% relative humidity, a water vapor transmission rate of between 0 to 0.1 g/100 in$^2$/24 hours at 100° F. (0 to 1.55 g/m$^2$/24 hours at 38° C.) and 90% relative humidity, and a minimum heat seal strength of 2,000 g/in (g/2.54 cm) at 280° F. (138° C.).

2. The packaging web of claim 1 wherein the metal coating is a vacuum deposited aluminum or aluminum-containing alloy.

3. The packaging web of claim 1 wherein the base layer has a thickness of between 0.05 to 10 mils (1.27 to 254 microns).

4. The packaging web of claim 1 wherein the base layer comprises an ethylene/vinyl alcohol copolymer and the packaging web has an oxygen gas transmission rate of between 0 to 0.5 cm$^3$/100 in$^2$/24 hours at 73° F. (0 to 7.75 cm$^3$/m$^2$/24 hours at 23° C.).

5. The packaging web of claim 1 wherein the base layer comprises a polyamide and the packaging web has an oxygen gas transmission rate of between 0 to 0.5 cm$^3$/100 in$^2$/24 hours at 73° F. (0 to 7.75 cm$^3$/m$^2$/24 hours at 23° C.).

6. A flexible packaging web
   (a) comprising a first ply comprising a non-oriented sealant film characterized by a secant modulus of less than 120,000 psi and an elongation at break of greater than 150%, wherein the non-oriented sealant film is a coextruded blown film, wherein the non-oriented sealant film comprises a thermoplastic base layer of ethylene/vinyl alcohol copolymer and a heat sealing layer of polyethylene, polyethylene copolymer, ionomer or blends thereof, and wherein the base layer of the non-oriented sealant film has a metal coating deposited thereon having a thickness of between 1.0 to 100 nanometers and an optical density of 1.0 to 3.0 which renders the entire surface of the non-oriented sealant film opaque; and (b) further comprising a second ply disposed adjacent to the metal coating, wherein the second ply comprises an oriented film of polyethylene terephthalate, polypropylene, polyimide or polylactic acid, or a film of paper or regenerated cellulose; and (c) wherein the packaging web has an oxygen gas transmission rate of between 0 to 0.5 $cm^3/100$ $in^2/24$ hours at 73° F. (0 to 7.75 $cm^3/m^2/24$ hours at 23° C.) and 0% relative humidity, a water vapor transmission rate of between 0 to 0.1 g/100 $in^2/24$ hours at 100° F. (0 to 1.55 $g/m^2/24$ hours at 38° C.) and 90% relative humidity, and a minimum heat seal strength of 2,000 g/in (g/2.54 cm) at 280° F. (138° C.).

7. The packaging web of claim 6 wherein the metal coating is a vacuum deposited aluminum or aluminum-containing alloy.

8. The packaging web of claim 6 wherein the base layer has a thickness of between 0.05 to 10 mils (1.27 to 254 microns).

9. A flexible packaging web
(a) comprising a first ply comprising a non-oriented sealant film characterized by a secant modulus of less than 120,000 psi and an elongation at break of greater than 150%, wherein the non-oriented sealant film is a coextruded blown film, wherein the non-oriented sealant film comprises a thermoplastic base layer of ethylene/norbornene copolymer and a heat sealing layer of polyethylene, polyethylene copolymer, ionomer or blends thereof, and wherein the base layer of the non-oriented sealant film has a metal coating deposited thereon having a thickness of between 1.0 to 100 nanometers and an optical density of 1.0 to 3.0 which renders the entire surface of the non-oriented sealant film opaque; and (b) further comprising a second ply disposed adjacent to the metal coating, wherein the second ply comprises an oriented film of polyethylene terephthalate, polypropylene, polyamide or polylactic acid, or a film of paper or regenerated cellulose; and (c) wherein the packaging web has an oxygen gas transmission rate of between 0 to 0.5 $cm^3/100$ $in^2/24$ hours at 73° F. (0 to 7.75 $cm^3/m^2/24$ hours at 23° C.) and 0% relative humidity, a water vapor transmission rate of between 0 to 0.1 g/100 $in^2/24$ hours at 100° F. (0 to 1.55 $g/m^2/24$ hours at 38° C.) and 90% relative humidity, and a minimum heat seal strength of 2,000 g/in (g/2.54 cm) at 280° F. (138° C.).

10. The packaging web of claim 9 wherein the metal coating is a vacuum deposited aluminum or aluminum-containing alloy.

11. The packaging web of claim 9 wherein the base layer has a thickness of between 0.05 to 10 mils (1.27 to 254 microns).

* * * * *

UNITED STATES PATENT AND TRADEMARK OFFICE
CERTIFICATE OF CORRECTION

PATENT NO. : 8,945,702 B2
APPLICATION NO. : 11/932031
DATED : February 3, 2015
INVENTOR(S) : Wuest et al.

It is certified that error appears in the above-identified patent and that said Letters Patent is hereby corrected as shown below:

In the specification,

In column 1, line 40, delete "(WTR)" and insert -- (WVTR) --, therefor.

In column 3, line 38, delete "thereof" and insert -- thereof. --, therefor.

In column 3, line 49, delete "high" and insert -- higher --, therefor.

In column 4, line 6, delete "the" and insert -- The --, therefor.

In column 5, line 32, delete "monomloer" and insert -- monomer --, therefor.

In column 5, lines 56-57, delete "(polyhexamethiylene" and insert -- (polyhexamethylene --, therefor.

In column 5, line 58, delete "(polyhexamnethylene" and insert -- (polyhexamethylene --, therefor.

In column 5, line 66, delete "copolymer)," and insert -- copolymer); --, therefor.

In column 6, line 3, delete "azelaiamide/" and insert -- azelamide/ --, therefor.

In column 6, line 7, delete "6/61" and insert -- 6/6I --, therefor.

In column 6, line 10, delete "polyhexamethiylene" and insert -- polyhexamethylene --, therefor.

In column 6, line 38, delete "Linder" and insert -- under --, therefor.

In column 6, line 66, delete "2.5," and insert -- 2.5; --, therefor.

In column 7, line 23, delete "tents" and insert -- terms --, therefor.

In column 7, lines 26-27, delete "[—OCH(R)C(O)—]$_n$," and insert -- [—OCH(R)C(O)—]$_n$ --, therefor.

In column 7, line 27, delete "R—CH$_3$." and insert -- R=CH$_3$. --, therefor.

In column 7, line 39, delete "NatureWorks*" and insert -- NatureWorks® --, therefor.

In column 7, line 58, before "material" delete "the" and insert -- tie --, therefor.

In column 7, line 64, delete "dePont" and insert -- duPont --, therefor.

In column 8, line 25, delete "tends" and insert -- terms --, therefor.

In column 9, line 14, delete "Berbeit," and insert -- Berbert, --, therefor.

In column 9, line 65, before "machine" delete "tile" and insert -- the --, therefor.

Signed and Sealed this
Eighth Day of March, 2016

Michelle K. Lee
*Director of the United States Patent and Trademark Office*

CERTIFICATE OF CORRECTION (continued)

In column 10, line 6, delete "macline" and insert -- machine --, therefor.

In column 10, line 41, delete "Thle" and insert -- The --, therefor.

In column 10, line 47, delete "Inc," and insert -- Inc., --, therefor.

In column 10, line 57, delete "de Pont" and insert -- duPont --, therefor.

In column 10, line 60, delete "61/6T" and insert -- 6I/6T --, therefor.

In column 11, line 28, delete "U.S.A.," and insert -- U.S.A.; --, therefor.

In column 11, line 40, delete "1.06 g/10 min." and insert -- 1.0 g/10 min. --, therefor.

In column 11, line 48-49, delete "de Pont de Neiilours" and insert -- duPont de Nemours --, therefor.

In column 11, line 55, delete ":10" and insert -- 10 --, therefor.

In column 11, line 61, delete "palmitrate," and insert -- palmitate, --, therefor.

In column 12, line 49, before "In" delete "I".

In column 12, line 56, delete "copolymner" and insert -- copolymer --, therefor.

In column 12, line 58, delete "-niodified" and insert -- -modified --, therefor.

In column 12, line 59, delete "(mod-LLD.PE)" and insert -- (mod-LLDPE) --, therefor.

In column 12, line 62, delete "low-delisity" and insert -- low-density --, therefor.

In column 13, line 27, delete "low-denisity" and insert -- low-density --, therefor.

In column 14, line 30, delete "ethylelle/vinyl" and insert -- ethylene/vinyl --, therefor.

In column 14, line 30, delete "copolyiner" and insert -- copolymer --, therefor.

In column 15, line 58, delete "LLDPE 30 mod" and insert -- LLDPE + mod --, therefor.

In column 17, line 45, after "results" delete "if" and insert -- of --, therefor.

In the claims,

In column 19, line 14, in claim 6, delete "polyimide" and insert -- polyamide --, therefor.